W. Quail.
Printers' Galley.
N⁰ 96145. Patented Oct. 26. 1869.
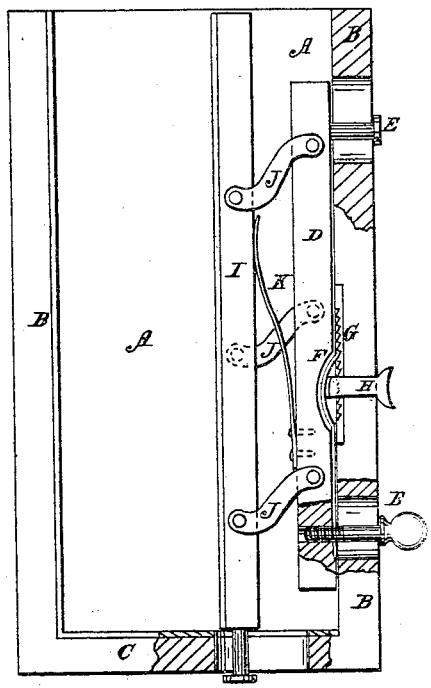
Witnesses,
A. W. Almquist
O. Hinchman
Inventor,
Wm Quail
per Munn &
Attys.

United States Patent Office.

WILLIAM QUAIL, OF NEW YORK, N. Y.

Letters Patent No. 96,145, dated October 26, 1869.

IMPROVEMENT IN PRINTERS' GALLEYS.

The Schedule referred to in these Letters Patent and making part of the same.

*To all whom it may concern:*

Be it known that I, WILLIAM QUAIL, of the city, county, and State of New York, have invented a new and useful Improvement in Printers' Galleys; and I do hereby declare that the following is a full, clear, and exact description thereof, which will enable others skilled in the art to make and use the same, reference being had to the accompanying drawing, forming part of this specification.

The figure is a top view of my improved printers' galley, parts being broken away, to show the construction.

My invention has for its object to improve the construction of printers' galleys, so as to make them more convenient for use; and It consists in the combination of a laterally-sliding bar, a longitudinally-sliding bar, pivoted connecting-arms, spring-pawl, and rack-bar with an ordinary galley, as hereinafter more fully described.

A represents the plate;

B, the sides, and

C, the end of a printers' galley.

D is a bar, placed upon the side of the side B, with which it is connected with set-screws E, passing through longitudinal slots in said side B, so that the said bar D may be moved longitudinally along the side B, and may be clamped in any position into which it may be moved, by tightening the said set-screws.

The set-screw E nearest the end C may be made with a knob or handle, for convenience in moving the slide D back and forth.

F is a spring-pawl, attached to the outer side of the bar D, and taking hold of the rack G, attached to the inner side of the side B, so as to hold the bar D securely in any position into which it may be moved.

To the spring-pawl F is attached an arm, H, projecting out into such a position that it may be reached and operated, to push the pawl F back from the rack G, by the forefinger of the hand that operates the sliding-bar B.

I is a bar placed upon the plate A, parallel with the bar D, with which it is connected by a series of arms J, one end of which is pivoted to the sliding-bar D, and the other ends of which are pivoted to the bar I.

The end of the bar I is connected with the end C of the galley, by a set-screw passing through a slot in the said end C.

By this construction and arrangement, as the bar D is moved longitudinally, the bar I will be moved laterally, so as to be always exactly parallel with the other side of the galley.

This construction also enables the galley to be adjusted to any desired width, and thus better adapted to the uses for which it is intended.

K is a spring, attached to the sliding-bar D, and the free end of which presses against the middle part of the bar I.

The spring K is designed simply to start the bar I, when the bars D and I are close together, in which position the arms J work at a disadvantage.

Having thus described my invention,

What I claim as new, and desire to secure by Letters Patent, is—

1. The parallel bars I D, connected with each other by the arms J, and combined with the side and end of an ordinary printers' galley, in such a way that the longitudinal movement of the bar D may give a lateral movement to the bar I, substantially as herein shown and described.

2. The combination of the spring-pawl F H and rack-bar G with the sliding bar D and side B of the galley, substantially as herein shown and described, and for the purpose set forth.

The above specification of my invention signed by me, this 26th day of March, 1869.

WILLIAM QUAIL.

Witnesses:
 FRANK BLOCKLEY,
 JAMES T. GRAHAM.